(No Model.) 5 Sheets—Sheet 1.

G. GRISEL.
SEWING MACHINE FOR MAKING BOTTLE COVERS.

No. 260,863. Patented July 11, 1882.

Witnesses
E. J. Redmond.
J. Walter Fowler

Inventor:
Geo. Grisel,
by Dewey & Co
A. H. Evans & Co.
Attys.

(No Model.) 5 Sheets—Sheet 2.

G. GRISEL.
SEWING MACHINE FOR MAKING BOTTLE COVERS.

No. 260,863. Patented July 11, 1882.

Witnesses,
Geo. H. Strong.
S. H. Krouse

Inventor,
George Grisel
By Dewey & Co.
Attorneys (No Model.) 5 Sheets—Sheet 3.

G. GRISEL.
SEWING MACHINE FOR MAKING BOTTLE COVERS.

No. 260,863. Patented July 11, 1882.

Witnesses,
Geo. H. Strong.
S. H. Nourse

Inventor
George Grisel
By Dewey & Co.
Attorneys (No Model.)  5 Sheets—Sheet 4.

G. GRISEL.
SEWING MACHINE FOR MAKING BOTTLE COVERS.

No. 260,863. Patented July 11, 1882.

Witnesses,
Geo. H. Strong.
S. H. Nourse

Inventor,
George Grisel
By Dewey & Co.
Attorneys (No Model.)  5 Sheets—Sheet 5.
G. GRISEL.
SEWING MACHINE FOR MAKING BOTTLE COVERS.
No. 260,863.  Patented July 11, 1882.
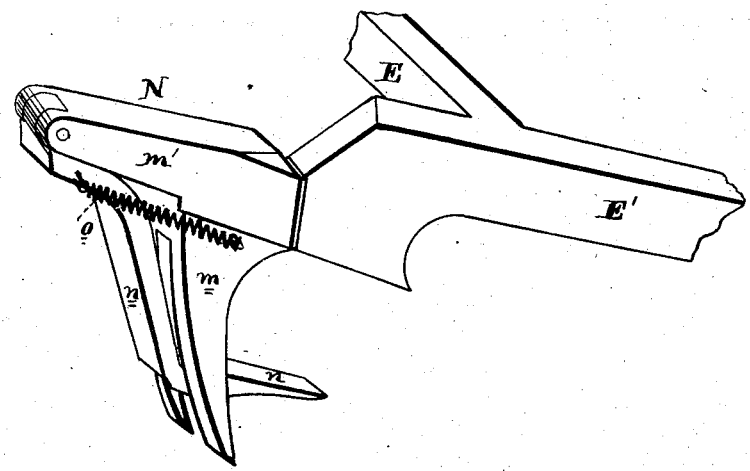
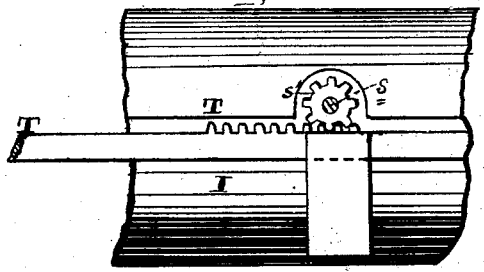
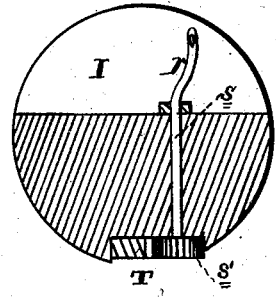
Witnesses,
Geo. H. Strong.
Inventor,
George Grisel
By Dewey & Co.
Attorneys

UNITED STATES PATENT OFFICE.

GEORGE GRISEL, OF SAN FRANCISCO, CALIFORNIA.

SEWING-MACHINE FOR MAKING BOTTLE-COVERS.

SPECIFICATION forming part of Letters Patent No. 260,863, dated July 11, 1882.

Application filed February 20, 1882. (No model.)

*To all whom it may concern:*

Be it known that I, GEORGE GRISEL, of the city and county of San Francisco, State of California, have invented a Machine for Making Bottle-Covers; and I hereby declare the following to be a full, clear, and exact description thereof.

My invention relates to a new and useful machine for making bottle-covers, having reference more particularly to the manufacture of covers made of the stems or stalks of reeds, grasses, tule, and other similar fibrous materials, for which said covers made of the stems or stalks of tule Letters Patent of the United States, dated October 18, 1881, No. 248,307, were issued to me jointly with Earl K. Cooley.

My invention consists in a peculiar feeder and in certain improvements therein, whereby, through the means of a peculiar double spring-pawl, the tule stems are laid upon each other in a double row at one end to give the tapering shape to the cover.

It consists, further, in a peculiar forming or sustaining bar, upon which the tule is fed and around which the cover is formed, a novel feature of said bar being a peculiar means by which it is raised and lowered and supported at one end only, whereby the cover, when formed, may be readily removed.

It consists, further, in a novel mechanism for forming the chain-stitch which binds the stalks together, and in certain other and minor details of construction, all of which will hereinafter more fully appear, reference being made to the drawings.

Figure 1:
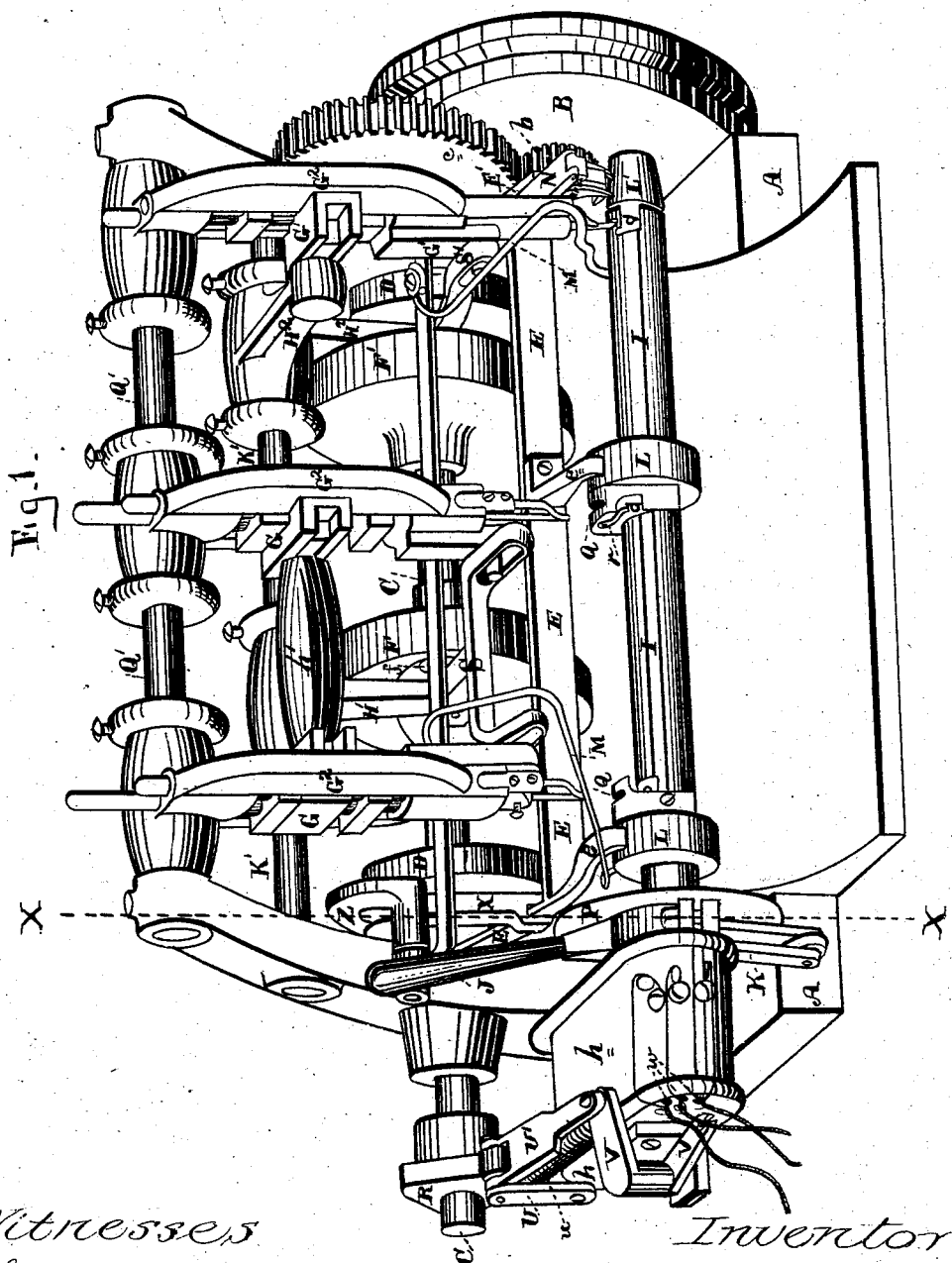
Figure 2:
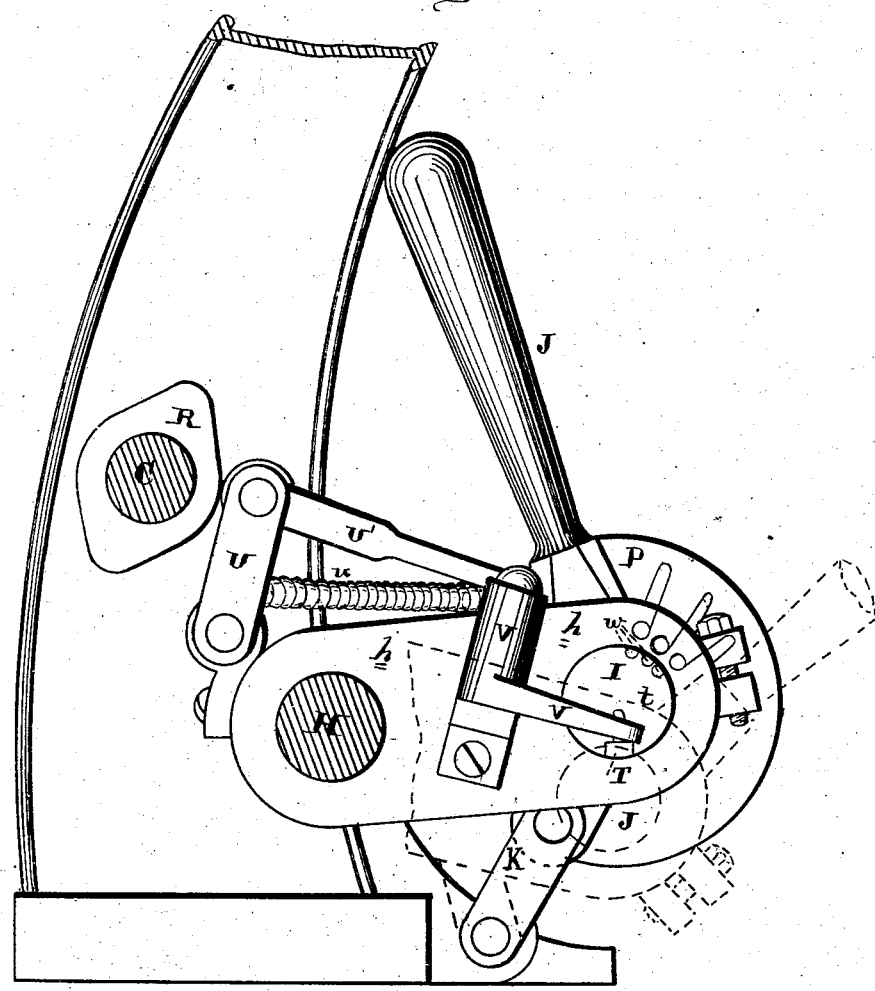
Figure 3:
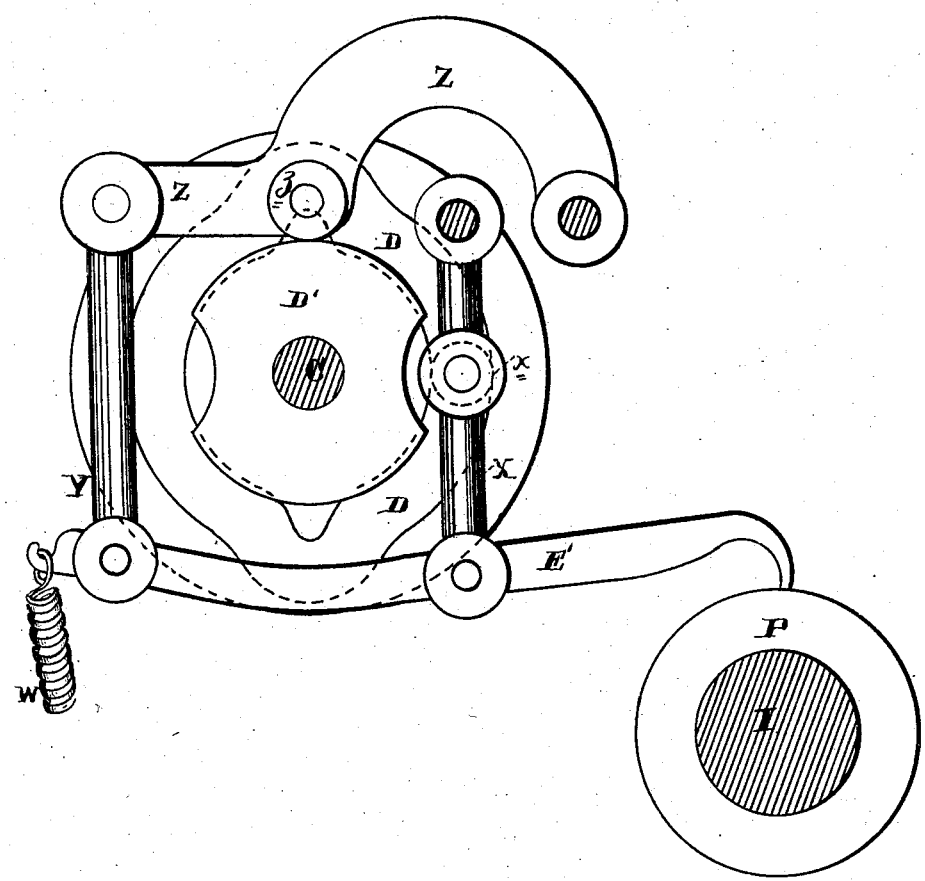
Figure 4:
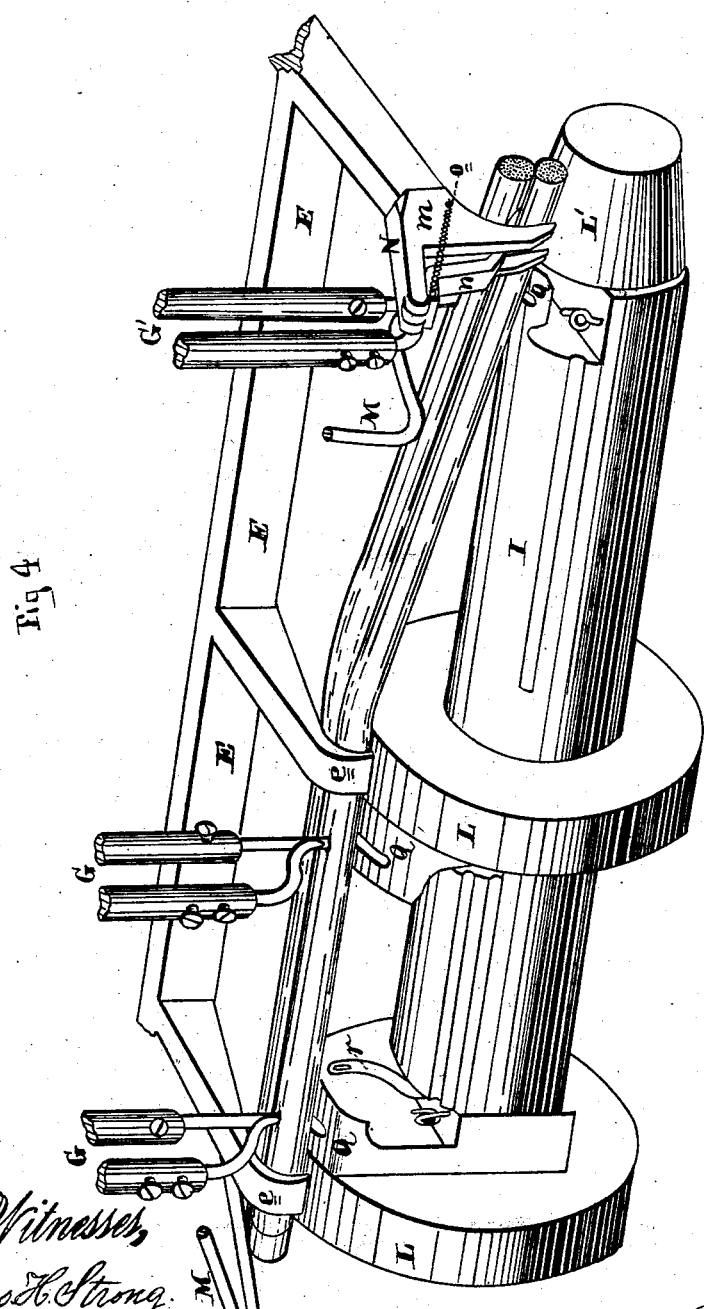

Figure 1 is a perspective view of my machine. Fig. 2 is an end view. Fig. 3 is a vertical cross-section through the line X X. Fig. 4 is an enlarged view of the forming-bar, feeder-bar, with its fingers and pawl, and needles operating through two stems of tule. Fig. 5 is an enlarged detail. Figs. 6 and 7 are sections of forming-bar.

Let A represent the base of the machine. It is adapted to be driven by treadle-power through a connecting-rod to the driving-wheel B. This is on a shaft carrying a gear, $b$, which meshes with a gear, $c$, upon the cam-shaft C.

E is the feeder-bar, attached at each end to the side pieces, E', which extend backwardly and are attached to springs W at their rear ends, as shown in Fig. 3. These side pieces are pivoted to and supported by levers X, which are journaled to the sides of the machine above. These levers have studs $x$, which work in the grooved cams D D upon the cam-shaft, and by which they are moved forward and back, thus giving a forward-and-return movement to the feeder-bar E. The side pieces, E', are again pivoted at their rear ends to connecting-rods Y, the upper ends of which are pivoted to the curved levers Z, journaled to the sides of the frames. These curved levers Z have rollers $z$, which are operated by the cams D' D' upon the cam-shaft. These cams are so arranged as to raise the curved levers Z, thus depressing the forward end of the side pieces and the feed-bar E, and to relieve them, when the springs W will elevate the said feeder-bar E. By this construction the feeder is given a movement forward and return in a kind of sweep, it being elevated and pushed forward and then depressed in returning, so that it may rise over the material and, descending, pull it in by means of its fingers $e$.

I have here shown an end and a central finger, $e$, upon the feeder-bar and a peculiar double pawl upon the other end, which I will hereinafter describe, Fig. 4.

Upon a bar, Q', in the top of the frame are journaled depending vertical frames $G^2$, in which are adapted to slide vertically the needle-bars G' G. This is accomplished by means of the bent levers H' $H^2$, journaled upon a shaft, K', and operated by the cams F F', into the grooves of which studs $f$ upon the lower ends of the levers fit. The upper arms of the levers H' $H^2$ are secured to the sliding needle-bars, and to the lower ends are pivoted arms S S', which extend forward, and have slotted ends fitting over pins in the needle-frames $G^2$. The bent lever H', operated by cam F, is attached by a cross-head, $h'$, to both needle-bars G, while the lever $H^2$, operated by cam F', is attached to needle-bar G'. The arm S is forked, and its double end is fitted to two needle-frames $G^2$, and the outer arm, S', is fitted to the remaining needle-frame alone. The bent levers H' $H^2$ raise and lower the needle-bars G G', while the arms S S' swing the needle-frames $G^2$, which are journaled above, to direct the needle-bars upon the material, to carry the thread forward, and to draw in the stems as the stitch is made. Cam F is so made as to operate, through the intermediate mechanism described, needle-bars G to make two strokes while needle-bar G' makes but one, being operated by its cam F' only one-half as fast as the other needle-bars. The reason for this is in the necessity of the case arising out of the construction of the bottle-cover. This cover is made up of separate stems or stalks of tule grass sewed together; but in order to give to it the necessary tapering form the stems must lie upon each other, or double at one end, while they lie side by side and single at the other end. This doubling up decreases the diameter at that end and gives the tapering form. The lower end and the center have to be stitched through each tule, while the upper end need only be stitched through those which lie upon each other—that is, through two at a time—and therefore the needle has only to make half as many strokes as the others.

H, Fig. 2, is a shaft journaled in the lower part of the frame and having upon one end a casting, $h$, in which is rigidly secured a horizontal bar, I, lying parallel with the shaft H, which shaft forms a bearing or center of motion for said bar. The other end of the bar is free. It is adapted to be raised and lowered through the required arc to bring it in relation with the feeder, or to remove it therefrom, by means of the lever J. This is loosely journaled upon the bar and has its under side pivoted to a swinging arm or lever, K, which is itself pivoted to the stationary frame below, as shown. By moving the lever J up until it comes in contact with the side supports above it straightens itself upon its swinging supporting-arm, and thus raises the bar I, which swings with its bearing or central shaft, H. In like manner the lever J will lower bar I. The movement of lever J is so adjusted that, when it is raised to contact with the side above, the centers or pivot-points of the supporting-arm K, its own pivot-point and the center of the bar I shall all be in the same straight line, Fig. 2. This insures its firm position, and the bar I cannot therefore be pushed down, except by moving the lever. In this way I am enabled to support this bar at one end only, leaving the other free for the purpose I shall hereinafter explain. This allows me also to move the bar with ease, as very little strength is necessary to operate the lever J.

Upon one end of the bar I and upon its center are rollers L, journaled to revolve readily, and upon the other and free end of the bar is a smaller roller, L', about the same diameter as the bar itself. The bar I is the supporting and forming bar. A stem of tule is fed from any suitable table or frame in front upon the rollers of the bar, and as it is succeeded by others it follows the rollers around and is finally grasped by the operator and brought up upon the front, side, and top, and is stitched to the tule being fed into the machine, and thus is the circle completed about the bar.

As before described, the stems of tule must at the upper end of the cover be in a double row. I will now explain the improvement in the feeder by which this is accomplished.

M M are guide-wires at each end to hold the tule down upon the rollers of the forming-bar. I have mentioned the fingers $e$ upon the feeder at one end and at the center. These work over and upon the rollers L, and are adapted to place the stems side by side, Fig. 4. At the other end of the feeder is secured an arm, having secured upon its end a peculiar double pawl, N, having a a downwardly-projecting bifurcated claw, $m$, and at about right angles thereto a projection, $m'$, in the extreme outer end of which is pivoted a spring guiding-pawl, $n$, which, after passing downward, as shown in Fig. 5, passes rearwardly between the bifurcations of the claw $m$. Springs $o$, attached to pawl $m$ and to pawl $n$, hold the latter against the former and return it to its place when pushed out. The use of this pawl I will show by explaining the operation of the machine up to this point. (See Fig. 4.) A stem of tule of the required length is placed upon the rollers of the bar I. The fingers $e$ and the pawl N come forward and downward to the stem and pull it in. At the same time the two needles G rise and the stem is pulled directly under them. Its outer end is simply pulled against the needle G' at that end, which does not rise until the next stroke of needle G, as I have before explained. The two needles G descend and pass through the stem, and while so doing draw the stem farther in. The fingers $e$ and pawl N during this time rise and come forward for the next stem. The outer end of the first stem, which was pressed down by the pawl N upon the end roller, L', being now relieved, springs up to the limit of the guide M to conform to the horizontal. The fingers and pawl draw in the following stem, the former placing it alongside of the first, while the latter presses it down by means of the guiding-pawl $n$, and with the feeding-pawl $m$ draws it under the raised end of the first stem. The three needles now rise and descend, the two G passing through the second stem, and the end one, G', passing through both stems, one lying upon the other, as described. The guiding-pawl $n$ of the large pawl N, being pivoted and adapted to swing, will withdraw itself readily from between the stems when the feeder next rises, and its springs will return it to its place. Thus the upper end of the cover is stitched in a double row, while the lower end is left single. In the pawl N the feeding-pawl $m$ draws the tule in, while the guiding-pawl $n$ presses it down to pass under the previous tule. When the cover is made I can easily remove it by lowering the forming-bar I, as described, and taking it off the free end, nothing can obstruct its removal, as the bar has all its connections at one end.

P is a disk upon the bar I, which defines the limit of the ends of the stems and keeps them even.

Q are frames upon the bar I, having slots in them through which the needles pass. Under these are swinging arms $r$, set upon vertical pivots or shafts s, which pass down through the bar and have pinions s' upon their lower ends, Figs. 6 and 7. With these engages a horizontal rack-bar, T, which is supported suitably in a groove in the under side of the bar I. This rack extends the whole length of the bar and engages and operates all the pinions of the arms r. Its end projects from the bar I, and it is operated as follows, Figs. 1 and 2: Upon the main cam-shaft C is a cam, R. This impinges against a roller in a lever, U, which is pivoted to a bearing upon the casting h. This lever has pivoted to its upper end another lever, U', the forward end of which is pivoted to and operates a bell-crank lever, V, journaled upon a bearing attached to the casting h. The forward end of the bell-crank lever V is slotted and embraces a pin, t, upon the projecting end of the rack-bar T. Springs u, connected with the bell-crank lever V and a pin upon the casting h, return said lever when the cam relieves it. When the cam is revolved and impinges upon the roller it pushes forward the lever U'. This operates the bell-crank lever V to draw the rack-bar T out and throw the arms r through a semicircle around the point of the needles. The springs u push the bar T in and return the arms r. Thread proceeds from proper sources through suitable guides, w, made in the bar I, and thence through directing-eyes to each arm r, through an eye in the end of which it passes. The needles have ordinary hooked ends, and the stitch formed is an ordinary chain-stitch. When the needles penetrate through to their limit the swinging arms r carry the thread around their hooked points, so that in rising they carry the thread up through the material.

Having thus described my invention, what I claim as new, and desire to secure by Letters Patent, is—

1. In a machine for making bottle-covers of the stems or stalks of reeds, grasses, tule, and other similar fibrous material, the feeder-bar E, with its fingers e e, in combination with a means for imparting to said bar a forward-and-return sweep, as described, to extend its fingers over and draw in the material, substantially as herein described.

2. In a machine for making bottle-covers, as specified, the feeder-bar E, with its fingers e e, in combination with the means for giving to it a forward-and-return sweep, as described, consisting of the cams D D D' D', curved levers Z, rods Y, springs W, levers X, and side pieces, E', substantially as herein described.

3. In a machine for making bottle-covers of the stems or stalks of reeds, grasses, tule, and other similar fibrous material, the pawl N, constructed as shown, and attached to the feeder of the machine for feeding and guiding the stalks and stems at one end to form a double row and give to the covering a tapering shape, substantially as herein described.

4. In a machine for making bottle-covers of the stems or stalks of reeds, grasses, tule, and other similar fibrous material, as specified, the double pawl N, consisting of the pawl m, with its bifurcated lower arm for feeding the material to the needle, and the pawl n, hinged to the outer arm of the pawl m, and having its lower end project inwardly through the bifurcated arm of the pawl m, and held therein by springs o for guiding and directing each alternate stem or stalk under the preceding one, substantially as herein described.

5. In a machine for making bottle-covers of the stems or stalks of reeds, grasses, tule, and other similar fibrous material, as specified, having a feeder, E, adapted to draw the stems under the needles, as described, and in combination therewith the double pawl N, attached to one end of the feeder, said pawl consisting of the feeding-pawl m and the guiding-pawl n, arranged to operate together, as shown, substantially as and for the purpose herein described.

6. In a machine for making bottle-covers, as specified, the forming-bar I, with its rollers L L L', in combination with the feeder E, and the double pawl N, consisting of a feeding-pawl m and a guiding-pawl n, constructed and operating together, as shown, to double the material, substantially as herein described.

7. In a machine for making bottle-covers, as specified, the forming-bar I for receiving the material, having its connections upon one end only and its other end free, in combination with a mechanism for raising and lowering said bar, substantially as and for the purpose herein described.

8. In a machine for making bottle-covers, as specified, a forming-bar, I, secured at one end to a pivot-shaft, H, by the connecting-casting h, in combination with the lever J, journaled upon the bar I, and pivoted to the swinging arm or lever K, by means of which the said bar is raised and lowered, and held firmly when raised, substantially as herein described.

9. In a machine for making bottle-covers, as specified, the forming-bar I, in combination with the rollers L L', substantially as and for the purpose herein described.

10. The combination, in a machine for making bottle-covers, as specified, of the forming-bar I, guide-wires M M, and limiting-disk P, substantially as herein described.

11. In a machine for making bottle-covers, as specified, the needle-bars G G', the former adapted to stitch the stems at the bottom and middle and the latter at the top, in combination with a mechanism for operating the needle-bar G', sewing the top of the cover, one-half as fast as the needle-bars G, substantially as and for the purpose herein described.

12. In a machine for making bottle-covers, as specified, the needle-bars G G', in combination with the mechanism for operating needle-bar G', sewing the top of the cover, one-half as fast as the needle-bars G, consisting of the cams F F' and bent levers H' H², journaled upon the shaft K', substantially as herein described.

13. In a machine for making bottle-covers, as specified, the combination and arrangement of the swinging needle-frames G², needle-bars G G', arms S S', bent levers H' H², and cams F F', substantially as and for the purpose herein described.

14. In a machine for making bottle-covers, as specified, the bar I, having the swinging pivoted threading-arms r, with pinions s', in combination with the horizontal rack-bar T, and a mechanism for giving said rack-bar a lateral motion, substantially as and for the purpose herein described.

15. In a machine for making bottle-covers, as specified, having needles and a mechanism for operating them, as shown, the bar I, having the pivoted threading-arms r, said arms being adapted to throw the thread around the hooked end of the needle by means of their pivots s and pinions s', and the laterally-moving horizontal rack-bar T, substantially as herein described.

16. In a machine for making bottle-covers, as specified, the bar I, having the swinging pivoted threading-arms r, with pinions s', in combination with the horizontal rack-bar T and the means for giving to it a lateral motion, consisting of the bell-crank lever V, with its slotted end engaging with a pin, t, upon the projecting end of said rack-bar, levers U U', with their springs u, and the cam R upon the cam-shaft C, substantially as herein described.

17. In a machine for making bottle-covers, as specified, having needles and a mechanism for operating them, the horizontal bar I, having a mechanism, as shown, for raising and lowering it, said bar having the slotted needle-frames Q and swinging threading-arms r, operated by the laterally-moving horizontal rack-bar T, and having thread-directing grooves w and guides, substantially as herein described.

In witness whereof I hereunto set my hand.

GEORGE GRISEL.

Witnesses:
C. D. COLE,
J. H. BLOOD.